(12) United States Patent
Kavantzas et al.

(10) Patent No.: US 10,135,803 B2
(45) Date of Patent: *Nov. 20, 2018

(54) DYNAMIC IDENTITY SWITCHING

(71) Applicant: Oracle International Corporation, Redwood Shores, CA (US)

(72) Inventors: Nickolas Kavantzas, Emerald Hills, CA (US); Jiandong Guo, Palo Alto, CA (US); Pratibha Gupta, Cupertino, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/299,196

(22) Filed: Oct. 20, 2016

(65) Prior Publication Data

US 2017/0041308 A1 Feb. 9, 2017

Related U.S. Application Data (63) Continuation of application No. 13/486,907, filed on Jun. 1, 2012, now Pat. No. 9,507,927.

(Continued)

(51) Int. Cl.
*H04L 29/06* (2006.01)
*G06F 21/62* (2013.01)
*G06F 21/33* (2013.01)

(52) U.S. Cl.
CPC .............. *H04L 63/08* (2013.01); *G06F 21/33* (2013.01); *G06F 21/6218* (2013.01);

(Continued)

(58) Field of Classification Search
CPC .... H04L 63/20; H04L 63/102; G06F 21/6218
See application file for complete search history.

(56) References Cited

U.S. PATENT DOCUMENTS 6,516,416 B2  2/2003  Gregg et al.
7,290,288 B2  10/2007  Gregg et al.
(Continued)

OTHER PUBLICATIONS

U.S. Appl. No. 13/486,848, "Final Office Action", dated Jun. 25, 2014, 9 pages.

(Continued)

*Primary Examiner* — Jason Chiang
(74) *Attorney, Agent, or Firm* — Kilpatrick Townsend & Stockton LLP (57) ABSTRACT

Techniques are disclosed for dynamically switching user identity when generating a web service request by receiving, at a client application, an invocation of a web service, the invocation associated with a first authenticated user identity of a first user, identifying a second user identity, verifying that a switch from the first user identity to the second user identity is permitted by switching rules, including the second user identity in a service request when the switch is permitted, and communicating the service request to the web service. The switching rules can include associations between initial user identities and permitted user identities. Verifying that a switch is permitted can include searching the associations for an entry having an initial user identity that matches the first authenticated user identity and a new user identity that matches the second user identity, wherein the switch is permitted when the entry is found.

15 Claims, 7 Drawing Sheets

Related U.S. Application Data (60) Provisional application No. 61/541,442, filed on Sep. 30, 2011.

(52) U.S. Cl.
CPC .......... H04L 63/10 (2013.01); H04L 63/102 (2013.01); H04L 63/20 (2013.01)

(56) References Cited

U.S. PATENT DOCUMENTS

| | | | | |
|---|---|---|---|---|
| 7,367,044 | B2* | 4/2008 | Fowler | H04L 9/3265 455/414.1 |
| 8,190,593 | B1* | 5/2012 | Dean | G06F 17/30864 707/707 |
| 8,359,396 | B2* | 1/2013 | Chan | G06F 21/41 705/56 |
| 8,397,302 | B2* | 3/2013 | Mont | G06Q 10/0635 726/1 |
| 8,458,781 | B2 | 6/2013 | Radhakrishnan | |
| 8,468,578 | B1* | 6/2013 | Lu | H04L 63/105 713/155 |
| 2002/0078365 | A1* | 6/2002 | Burnett | G06F 21/31 726/26 |
| 2003/0133554 | A1* | 7/2003 | Nykanen | H04L 29/06 379/201.01 |
| 2003/0177388 | A1 | 9/2003 | Botz et al. | |
| 2004/0117489 | A1* | 6/2004 | Harmon | H04L 63/08 709/229 |
| 2005/0204146 | A1* | 9/2005 | Kebinger | G06F 21/31 713/182 |
| 2006/0116105 | A1* | 6/2006 | Frankel | G06Q 30/06 455/406 |
| 2006/0206932 | A1* | 9/2006 | Chong | H04L 63/0807 726/10 |
| 2007/0255841 | A1 | 11/2007 | Chong | |
| 2008/0109884 | A1* | 5/2008 | Kulkarni | G06F 21/31 726/5 |
| 2009/0210499 | A1* | 8/2009 | Upadhyayula | G06Q 10/06 709/206 |
| 2010/0001833 | A1* | 1/2010 | Alexander | H04L 63/08 340/5.84 |
| 2010/0115577 | A1 | 5/2010 | Ratnala et al. | |
| 2010/0154041 | A1 | 6/2010 | Dalzell et al. | |
| 2010/0318604 | A1* | 12/2010 | Stafie | H04L 63/08 709/203 |
| 2011/0004753 | A1 | 1/2011 | Gomi et al. | |
| 2011/0035794 | A1 | 2/2011 | Wang et al. | |
| 2011/0202988 | A1 | 8/2011 | Otranen et al. | |
| 2012/0060210 | A1* | 3/2012 | Baker | H04L 63/0807 726/9 |
| 2013/0047240 | A1 | 2/2013 | Radhakrishnan | |
| 2014/0033285 | A1 | 1/2014 | Gagliano | |

OTHER PUBLICATIONS

U.S. Appl. No. 13/486,848, "Non-Final Office Action", dated Mar. 4, 2014, 12 pages.
U.S. Appl. No. 13/486,848, "Notice of Allowance", dated Oct. 17, 2014, 16 pages.
U.S. Appl. No. 13/486,907, "Final Office Action", dated May 12, 2015, 17 pages.
U.S. Appl. No. 13/486,907, "Final Office Action", dated Apr. 10, 2014, 20 pages.
U.S. Appl. No. 13/486,907, "Non-Final Office Action", dated Oct. 21, 2013, 17 pages.
U.S. Appl. No. 13/486,907, "Non-Final Office Action", dated Jan. 10, 2016, 16 pages.
U.S. Appl. No. 13/486,907, "Non-Final Office Action", dated Jan. 21, 2015, 21 pages.
U.S. Appl. No. 13/486,907, "Notice of Allowance", dated Jul. 25, 2016, 20 pages.

* cited by examiner

DYNAMIC IDENTITY SWITCHING

CROSS-REFERENCES TO RELATED APPLICATIONS

This Continuation Application claims the benefit of U.S. Non-Provisional Application No. 13/486,907, filed Jun. 1, 2012, entitled "DYNAMIC IDENTITY SWITCHING", which claims the benefit and priority under 35 U.S.C. 119(e) of U.S. Provisional Application No. 61/541,442, filed Sep. 30, 2011, entitled "DYNAMIC IDENTITY CONTEXT PROPAGATION AND IDENTITY SWITCHING," the entire contents of which are incorporated herein by reference for all purposes.

The present application also incorporates by reference for all purposes the entire contents of the following commonly-assigned application, which was filed concurrently with priority U.S. application Ser. No. 13/486,907:

U.S. Non-Provisional application Ser. No. 13/486,848, filed Jun. 1, 2102, entitled "DYNAMIC IDENTITY CONTEXT PROPAGATION", now U.S. Pat. No. 8,966,572.

BACKGROUND

In an enterprise Web service and service-oriented architecture (SOA) environment, user identity (e.g., user name and/or ID) is typically propagated across layers of different interconnected applications. When such user identity information is propagated from a Web service client to a Web service, the information is usually protected via a security mechanism (e.g., WS-SecurityPolicy) and is accompanied by an authentication token such as a Security Assertion Markup Language (SAML) token. With the SAML mechanism, an individual originating a service request (i.e., the subject) is authenticated via a local authentication service that the Web service client trusts. Once the subject is authenticated, the Web service client transmits the service request, along with a user identity, to the Web service. The request further includes an assertion (in the form of a SAML token) that the user identity is authentic. Generally speaking, the user identity that is transmitted in the service request is the identity of the authenticated subject.

SUMMARY

In one aspect, in accordance with one or more embodiments, user identity information can be propagated from one web service application to another by including the user identity information in service requests sent between the two applications. In some cases, the user identity that should be propagated may not correspond to the authenticated subject. By way of example, the Web service client may wish to switch the user identity to a different user that has more extensive authorization privileges, in order to complete a certain task. In these cases, the user identity to be propagated may only be determinable at runtime.

According to another set of embodiments, techniques are provided for dynamically switching user identity at the time of generating a Web service request. For example, a first user can be authenticated to a Web service client application (via., e.g., a single sign-on service) and can initiate a task that requires execution of a Web service operation. Rather than transmitting the first user's identity to the Web service as part of a service request, the Web service client can dynamically determine the identity of a different, second user. This determination can be based on preconfigured information, or can be determined at runtime via, e.g., an appropriate service. The Web service client can then transmit the user identity of the second user (rather than the first user) as part of the service request.

Embodiments of the present invention provide methods, systems, and machine-readable media for dynamically switching between user identities. In one embodiment, a method of dynamically switching between user identities is provided, and the method comprises receiving, by a computer system, at a client application, an invocation of a web service, the invocation associated with a first authenticated user identity of a first user; identifying, by the computer system, a second user identity; verifying, by the computer system, that a switch from the first authenticated user identity to the second user identity is permitted by one or more switching rules; including, by the computer system, the second user identity in a service request when the switch is permitted; and communicating, by the computer system, the service request to the web service.

Embodiments of the invention may include one or more of the following features. Identifying the second user identity may comprise dynamically determining the second user identity at runtime. The one or more switching rules may comprise associations between initial user identities and permitted user identities, and verifying that a switch is permitted may comprise searching, by the computer system, the associations for an entry having an initial user identity that matches the first authenticated user identity and a new user identity that matches the second user identity, wherein the switch may be permitted when the entry is found in the associations. Identifying the second user identity may comprise determining, by the computer system, the second user identity based upon the one or more switching rules. The one or more switching rules may comprise one or more associations between initial user identities and permitted user identities, and verifying that a switch is permitted may comprise searching, by the computer system, the associations for an entry having an initial user identity that matches the first authenticated user identity, wherein the switch may be permitted when the entry is found in the associations, and the second user identity may be based upon a new user identity associated with the entry having the initial user identity that matches the first user identity.

Including the second user identity in the service request may include storing the second user identity in a subject field of the service request. Including the second user identity in the service request may comprise storing the second user identity in a security token included in the service request. Invocation by the second user may be permitted when one or more attributes of the rule match corresponding values determined at runtime. A first rule of the one or more switching rules may comprises a permitted application, a permitted initial identity, and a permitted new identity, and the verifying that a switch is permitted may comprise comparing the permitted application to the client application, comparing the permitted initial identity to the identity of the first user, and comparing the permitted new identity to the identity of the second user, wherein the invocation by the second user may be permitted when the permitted application matches the client application, the permitted initial identity matches the identity of the first user, and the permitted new identity matches the identity of the second user. The first rule of the one-on-one switching rules may comprise a condition based on one or more attributes of the client application, and invocation by the second user may be permitted when the condition is satisfied. The condition may be further based upon one or more values determined at runtime.

According to another embodiment of the present invention, a machine-readable medium for a computer system having stored thereon a series of instructions executable by a processor to dynamically switch between user identities is provided. The instructions include instructions that cause the processor to receive, at a client application, an invocation of a web service, the invocation associated with a first authenticated user identity of a first user; instructions that cause the processor to identify a second user identity; instructions that cause the processor to verify that a switch from the first authenticated user identity to the second user identity is permitted by one or more switching rules; instructions that cause the processor to include the second user identity in a service request when the switch is permitted; and instructions that cause the processor to communicate the service request to the web service.

Embodiments of the invention may include one or more of the following features. The instructions that cause the processor to identify the second user identity may comprise instructions that cause the processor to dynamically determine the second user identity at runtime. The one or more switching rules may comprise associations between initial user identities and permitted user identities, and the instructions that cause the processor to verify that a switch is permitted may comprise instructions that cause the processor to search the associations for an entry having an initial user identity that matches the first authenticated user identity and a new user identity that matches the second user identity, wherein the switch may be permitted when the entry is found in the associations. The instructions that cause the processor to identify the second user identity may comprise instructions that cause the processor to determine the second user identity based upon the one or more switching rules.

The one or more switching rules may comprise one or more associations between initial user identities and permitted user identities, and the instructions that cause the processor to verify that a switch is permitted may comprise instructions that cause the processor to search the associations for an entry having an initial user identity that matches the first authenticated user identity, wherein the switch may be permitted when the entry is found in the associations, and the second user identity may be based upon a new user identity associated with the entry having the initial user identity that matches the first user identity.

The instructions that cause the processor to include the second user identity in the service request may include instructions that cause the processor to store the second user identity in a subject field of the service request. Invocation by the second user may be permitted when one or more attributes of the rule match corresponding values determined at runtime. A first rule of the one or more switching rules may comprise a permitted application, a permitted initial identity, and a permitted new identity, and the instructions that cause the processor to verify that a switch is permitted may comprise instructions that cause the processor to compare the permitted application to the client application, instructions that cause the processor to compare the permitted initial identity to the identity of the first user, and instructions that cause the processor to compare the permitted new identity to the identity of the second user, wherein the invocation by the second user may be permitted when the permitted application matches the client application, the permitted initial identity matches the identity of the first user, and the permitted new identity matches the identity of the second user.

According to another embodiment of the present invention, a system for dynamically switching between user identities is provided. The computer system includes a processor configured to receive, at a client application, an invocation of a web service, the invocation associated with a first authenticated user identity of a first user; identify a second user identity; verify that a switch from the first authenticated user identity to the second user identity is permitted by one or more switching rules; include the second user identity in a service request when the switch is permitted; and communicate the service request to the web service.

A further understanding of the nature and advantages of the embodiments disclosed herein can be realized by reference to the remaining portions of the specification and the attached drawings.

DETAILED DESCRIPTION

In the following description, for the purposes of explanation, numerous details are set forth in order to provide an understanding of embodiments of the present invention. It will be apparent, however, to one of ordinary skill in the art that certain embodiments can be practiced without some of these details.

Figure 1:
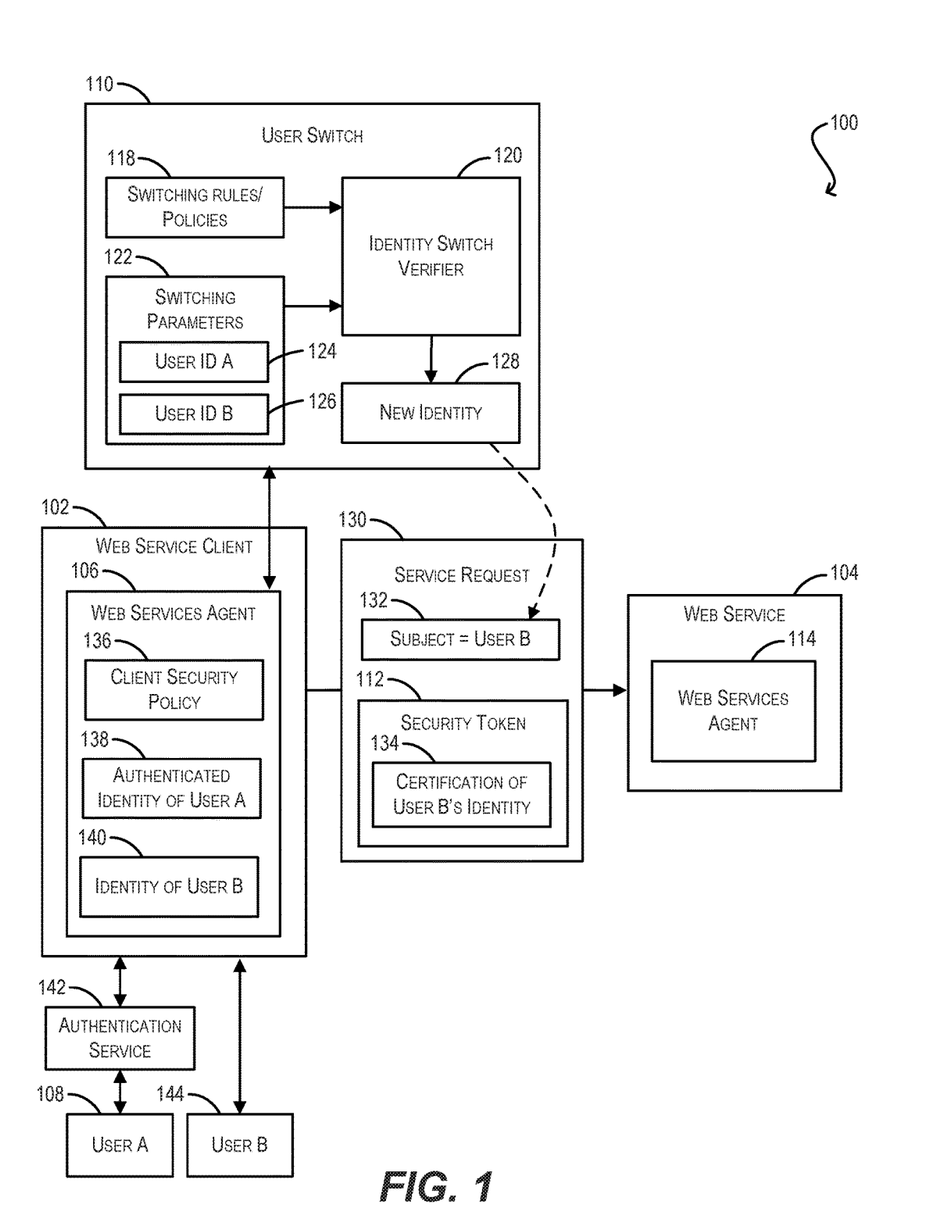
FIG. 1 is a simplified block diagram of a system for performing dynamic identity switching in accordance with an embodiment of the present invention.

FIG. 1 is a simplified block diagram of a system 100 for performing dynamic identity switching according to an embodiment of the present invention. As shown, system 100 includes a web application 102 configured to act as a Web service client, and a Web service 104. Web service client 102 and Web service 104 can include respective Web services agents 106, 114 configured to provide a policy-based mechanism for securing and managing messages 130 that are passed between the client 102 and the service 104, e.g., to implement Web service requests sent from the client 102 to the service 104 and responses sent from the service 104 to the client 102. Additional information regarding this mechanism can be found in U.S. patent application No. 13/118,947, filed May 31, 2011 and entitled "ATTACHING WEB SERVICE POLICIES TO A GROUP OF POLICY SUBJECTS," which is incorporated herein by reference in its entirety for all purposes.

In one set of embodiments, identity information regarding a user A (108) can be passed to Web service client 102. For example, the identity information for user A can be passed from another Web service, or can be received from a single sign on (SSO)/authentication system 142 that has authenticated user A. Upon executing one or more processes on behalf of user A, web service client 102 can generate a service request (i.e., message) 130 for invoking a service operation exposed by Web service 104. Agent 106 can intercept the service request or the instruction that causes the request to be sent, and determine one or more security policies 136 that may apply for protecting the service request 130. In one set of embodiments, the one or more policies 136 can include a SAML-based authentication policy. In other embodiments, the one or more policies 136 can include a different type of token-based authentication policy.

In a number of cases, upon enforcing the a SAML policy 136, agent 106 would include the user identity of the authenticated subject (i.e., user A) into a SAML assertion, and send the service request 130 and the assertion (in the form of a token) to Web service 104. However, in some circumstances, agent 106 may want to dynamically switch the user identity that is passed to service 104. For example, agent 106 may wish to switch the user identity to a different user (e.g., a super-user) that has more extensive authorization privileges in order to complete a certain task. In another example, certain services may require that specific identities be used, even though those user identities are not ordinarily associated with users in the system. In such cases, in one set of embodiments, agent 106 can access a user switch module 110, and pass the identity of user A 138 and the identity of a distinct user B 140, to which a switch us desired, to the user switch module 110. The user switch module 110 can then perform appropriate processing to determine whether a switch to the requested User B identity is permitted. If the switch is permitted, the identity of User B 140 is then stored in the service request 130, e.g., as a Subject 132, and a certification of User B's identity 134 is stored in a security token 112 in the service request 130. In another embodiment, the identity of User A 138 can be passed to the user switch module 110, and the user switch module 110 can determine the identity of user B 140 and return the identity of User B as a result to be stored in the Subject 132 and/or in the security token 112.

In one or more embodiments, the user switch module 110 can perform a lookup into static configuration information to determine the identity of user B, or perform processing based on one or more parameters to dynamically determine, at runtime, the identity of user B. The lookup can be based on switching rules 118, which list user IDs for which switching is permitted. An identity switch verifier 120 can check that the switch is permitted, e.g., by consulting the switching rules 118 for the given user ID A 124 and user ID B 126. If the identity switch verifier 120 determines that the switch is permitted, the new identity, e.g., user ID B 126, is returned as a result in a new identity value 128. If the verifier 120 determines that the requested switch is not permitted, them the new identity 128 is not returned, and an error is returned instead.

In one set of embodiments, a user switch system can be implemented in a computer programming language by defining a property that represents the new user identity to be used in a web service invocation. For example, the property can be named javax.xml.ws.security.auth.username, which is abbreviated as "username" herein. Then, when one web service process executing with a first user identity is to invoke another process using a second user identity, to cause the second process to execute using the second identity, the first web service process can invoke the other process with an input property that is named "username" and has a value set to the value of the second identity. This property can be declared as propagateable so that it will be propagated in web service invocations. In one example, the SOA framework's binding mechanism can transfer the property to a SOAP message context, so that the property can be detected and/or acted upon by the user switch module 110 to switch the identity stored in the outgoing SOAP request message to the identity specified by the property. A security policy can be defined and applied to a web service application to cause the application to perform a user switch when invoking a web service, with the user identity being switched to the value of the username property. If SAML authentication and message protection is being used, this dynamic identity switching policy may have a name such as "dynamic saml token with message protection client policy."

In one or more embodiments, when a web service invocation is being made, the dynamic identity switching policy causes the user identifier specified in the username property to be stored in a token in the outgoing request message, e.g., a SAML token. The Subject value associated with the current thread is ignored in this case. Prior to creating the SAML token, this policy causes a permission check to be executed to determine if the web service framework has permission to create a SAML token on behalf of the invoking process. This check is to avoid potentially rogue applications from providing an identity to the security framework, which the framework could otherwise potentially accept. In one example, the dynamic user switch policy disables local optimization for SOA to SOA interactions on the same server, so that the new user identity is communicated to the service in a message.

In one set of embodiments, a permission grant system can be implemented so that only applications that have an appropriate permission can be allowed to switch user identity in this manner. A permission object with a name such as WSIdentityPermission can be introduced to provide code grants to web service agents, and specify the applications for which the security framework will accept the new identity. The following is a sample permission grant that causes the web services agent 114 to trust an application 104 named TaskExecutionComposite, so that the agent 114 will accept externally supplied identities, such as a new identity received in a service request 130, for that application 104. This permission establishes a code grant to the agent 114:

```
<grantee>
  <codesource>
    <url>file:${common.components.home}/modules/oracle.wsm.agent.
common_11.1.1/wsm-agent.jar</url>
  </codesource>
</grantee>
<permissions>
  <permission>
    <class>oracle.wsm.security.WSIdentityPermission</class>
    <name>resource=TaskExecutionComposite</name>
    <actions>assert</actions>
  </permission>
<permissions>
```

In a further set of embodiments, the switching rules 118 can be one or more policies that can be used by the user switch module 110 to specify a set of users that agent 106 is allowed to switch from (e.g., user A), and/or a set of users that agent 106 is allowed to switch to (e.g., user B). If these policies are violated, the transaction can be aborted and an error can be thrown.

In one aspect, permission can be granted to allow one or more specific identities (e.g., users) to perform identity propagation and assertion. For example, the following permission allows TaskExecutionComposite to assert any of identities A, B, C, and D:

```
<permissions>
    <permission>
        <class>oracle.wsm.security.WSIdentityPermission</class>
        <name>resource=TaskExecutionComposite, allowedUserids=
        [A, B, C, D]</name>
        <actions>assert</actions>
    </permission>
<permissions>
```

In another aspect, permission can be granted to identities within a specific CSF Map. For example, permission can be granted to allow TaskExecutionComposite to assert identities from within a specific CSF Map as follows:

```
<permissions>
    <permission>
        <class>oracle.wsm.security.WSIdentityPermission</class>
        <name>resource=TaskExecutionComposite, allowedMap=MapName
        </name>
        <actions>assert</actions>
    </permission>
<permissions>
```

As described above, upon receiving the identity of user B from user switch component 110, agent 106 can include the identity of user B (rather than user A) in a SAML/authentication token 112 and pass the token, along with the service request, to Web service 104. At Web service 104, agent 114 can process the service request as needed. In one or more embodiments, the identity of user A 108 continues to be used at the client application 102.

Figure 2:
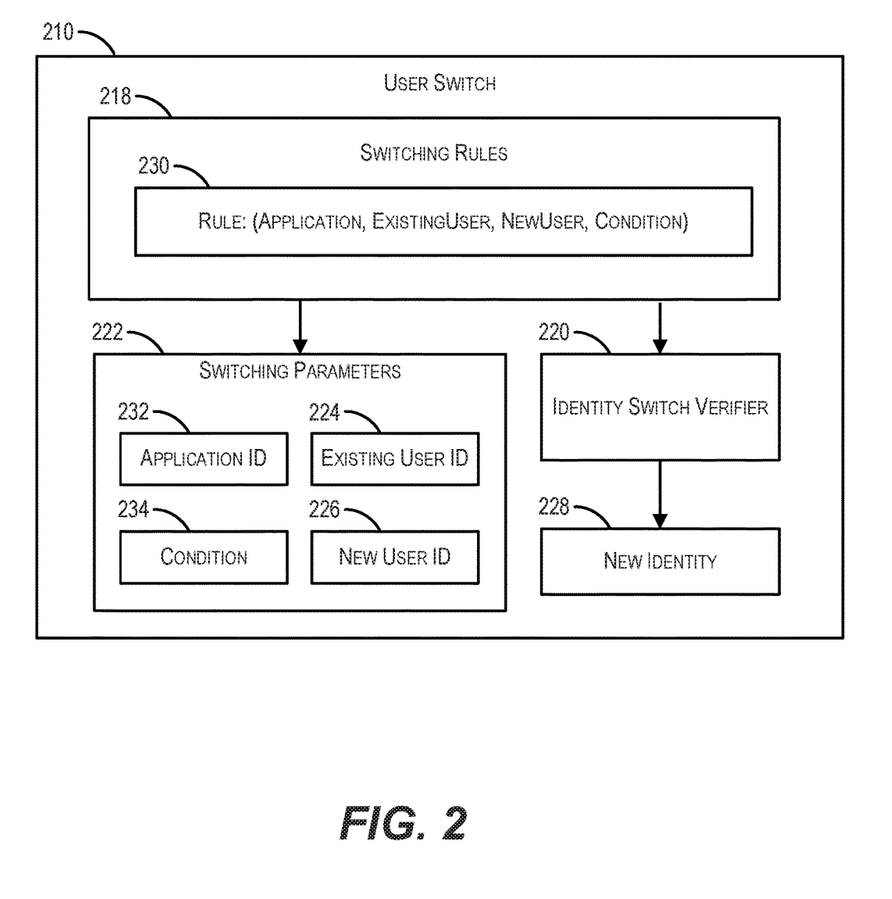
FIG. 2 is an illustrative drawing of a user switch module in accordance with an embodiment of the invention.

FIG. 2 is an illustrative drawing of a user switch module 210 in accordance with one embodiment of the invention. The user switch module 210 includes switching rules 218, switching parameters 222, and identity switch verifier 220, which produces a new identity 228. The user switch module 210 determines the new identity 228 by evaluating the rules 218 using the identity switch verifier 220 and the switching parameters 222 as input. The switching parameters can be supplied by the client application 102, and can also be retrieved from other data sources at runtime. In one example, the parameters 222 are values supplied by an invoking application or other application framework module. The parameters 222 include an existing user identifier 224, a new user identifier 226, an application identifier 232, and a condition 234. The parameters 222 are shown for illustrative purposes and did not be explicitly declared or used. In another example, the user switch module 210 can retrieve the values of the parameters 222 using any appropriate means, and need not receive the parameter values from the application. The existing user identifier 224 represents a current identity of a user of the application. The new user identifier 226 represents a user identity to which a switch is being requested. The application identifier 232 represents the application 102 that is executing or invoking the user switch module 210, although in other embodiments the application ID 232 can refer to an application that is different from the application invoking the user switch module 210.

A switching rule 230 is shown as an association between an application identifier value, an existing user identity, a new user identity, and a condition. The application identifier and condition portions of the rule are optional. The existing user identifier and the new user identifier portions of the rule establish an association that represents permission of the specified existing user identifier to switch to the specified new user identifier. In another embodiment, in which the user switch module determines the identity of the new user, the application invoking the user switch module does not supply a new user value to the user switch module. Instead, in this case, the user switch module provides the identity of the new user from the rule 230 to the application as a new user ID parameter 226. The switching rules 218 can include any number of rules 230, with each rule ordinarily having at least one portion (application, existing user, new user, or condition) that is different and distinguishes that rule 230 from other rules 218.

The user switch module 210 can use the application identifier portion of a rule 230 as another criterion when determining whether permission can be granted for the existing user to switch to the new user. A rule 230 can associate an application identifier 232 with the user identifiers 224, 226, so that the 230 rule is only satisfied if the application ID 232 matches the application identifier specified in the rule. For example, if the rule 230 includes an application identifier with a value of Application 1, then permission is granted if the user switch module 210 is invoked by Application 1.

In one or more embodiments, the identity switch verifier 220 evaluates each of the switching rules 218 using the values of the switching parameters 222. If one or more of the switching rules 218 is satisfied by (e.g., matches) the switching parameters 222, then the verifier 220 sets the new identity 228 to the value of the new user specified in the matching rule, and returns an indication that the switch is permitted. If none of the rules match, the new identity 228 is not provided, and a failure indicator is returned to indicate that the switch is not permitted. If the 230 rule includes a condition, the rule is satisfied when the rule matches the parameters and the condition evaluates to true. In one embodiment, a rule 230 matches the parameter when, for example, the application, existing user, and new user portions of the rule 230 match (e.g., are the same as, or match using pattern matching) the respective parameters (i.e., application ID 232, existing user ID 224, and new user ID 226) and the condition evaluates to true, if a condition is specified in the rule 230. In another embodiment, the user switch module 210 can determine the new user, in which case the new user ID parameter 226 is not specified (e.g., is null or empty), and the rule 230 matches the parameters 222 if the application and existing user portions of the rule 230 match the respective parameters 232, 224, and the condition, if present in the rule 230, is satisfied. A set of parameters 222 can match more than one rule, in which case one of the matching rules is selected, e.g., the first rule that matches, or some other appropriate logic can be defined to handle the multiple matches.

Figure 3:
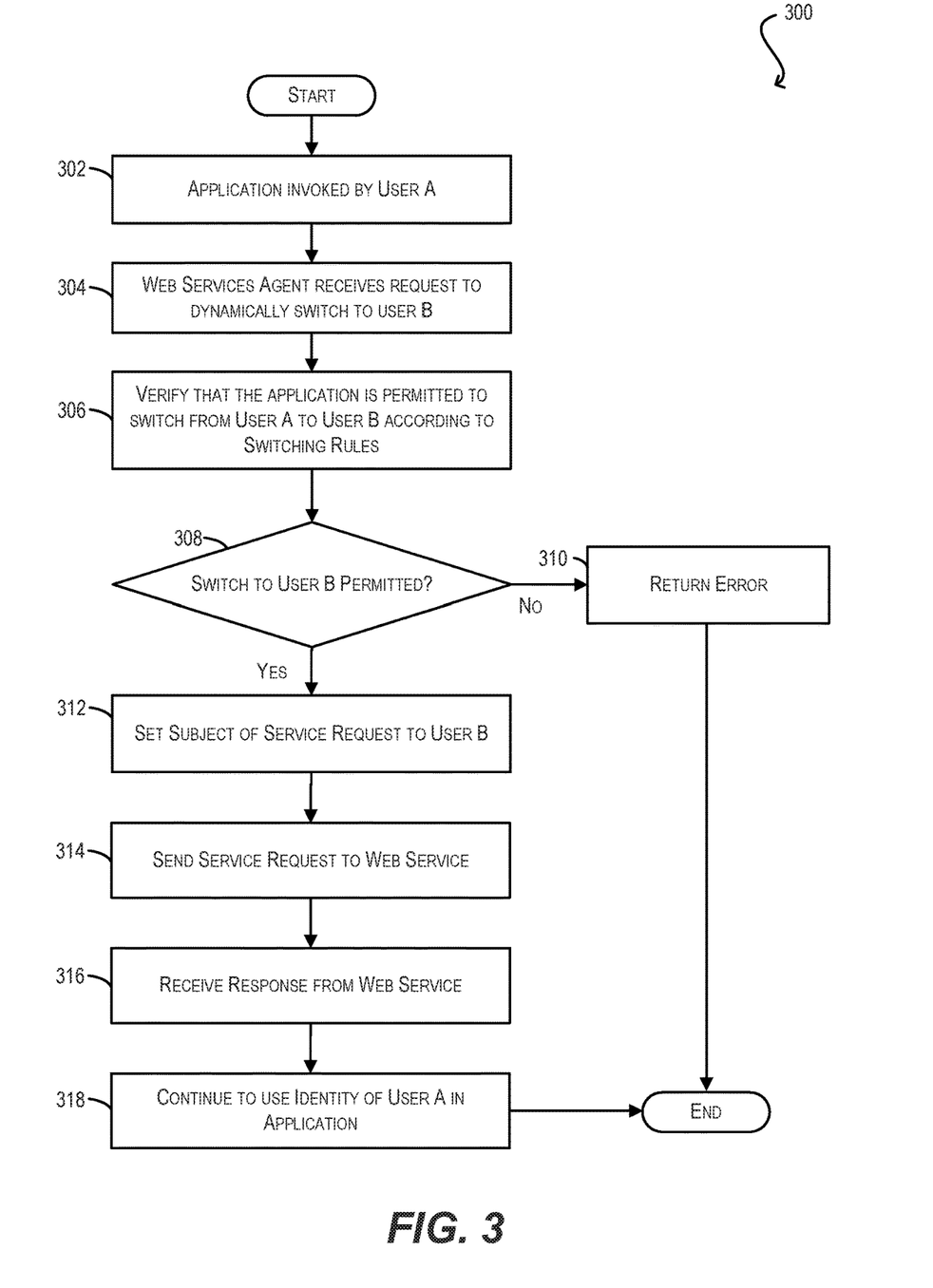
FIG. 3 is an illustrative drawing of a process for switching user identities in accordance with an embodiment of the invention.

FIG. 3 is an illustrative drawing of a process 300 for switching user identities in accordance with an embodiment of the invention. The process 300 begins at block 302, which is executed when an application is invoked by a user A. At block 304, the web services agent 106 receives a request to dynamically switch to user B, e.g., by detecting a policy that specifies a user switch, with the username property having the value "B". Block 306 verifies that the application is permitted to switch from the identity of user A to the identity of user B according to the switching rules 118. Block 306 can, for example, use the identity switch verifier 120 of the user switch module 110 to evaluate the switching rules 118 based on the switching parameters 122, as described below with reference to FIG. 4. If the switching parameters match at least one of the switching rules 118, the identity switch verifier 120 indicates that the application is permitted to switch from the identity of user A to the identity of user B. Block 308 transfers control to block 310 if the switch is not permitted, in which case block 310 returns an error to indicate that the switch cannot be performed, and the process 300 ends. If the switch is permitted, block 308 transfers control to block 312, which sets the subject attribute of the service request to the identity of user B. In one example, block 312 applies the dynamic identity switching policy to the application, and sets the value of the username attribute to the identity of user B. Block 314 sends the service request 130 with the identity of user B to the web service, which processes the request and returns a response. Block 316 receives the response from the web service, and at block 318 the application continues execution, using the identity of the user A.

Figure 4:
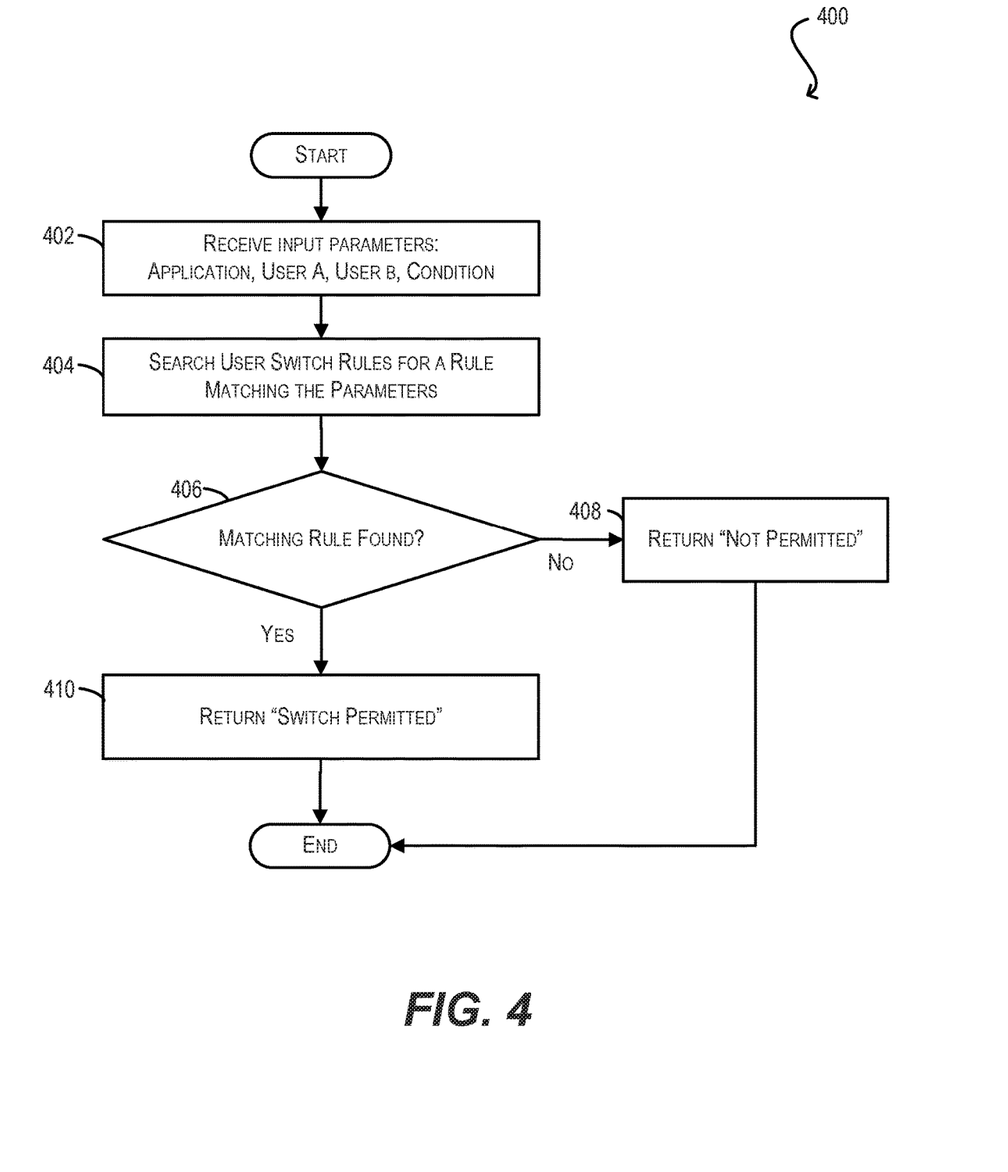
FIG. 4 is an illustrative drawing of a process for verifying that a user is permitted to switch to a new user identity according to switching rules.

FIG. 4 is an illustrative drawing of a process 400 for verifying that a user is permitted to switch to a new user identity according to switching rules. Block 402 receives input parameters, such as an application identifier, an existing user identity, a new user identity, and an optional condition, as described above with reference to FIG. 2. Block 404 searches the user switch rules 118 for a rule that matches the parameters. Block 406 determines if a matching rule was found. As described above, in one embodiment, a rule matches the parameter when, for example, the application, existing user, and new user portions of the rule match the respective parameters (i.e., application ID 232, existing user ID 224, and new user ID 226) and the condition evaluates to true (if there is a condition specified in the rule). In another embodiment, if the user switch module is to determine the new user, then the new user ID parameter 226 is not specified (e.g., null or empty), and the rule 230 matches the parameters 222 if the application and existing user match the respective parameters 232, 224, and the condition, if present in the rule 230, is satisfied. A set of parameters 222 can match more than one rule, in which case one of the matching rules is selected, e.g., the first rule that matches, or some other appropriate logic can be defined to handle the multiple matches. If a match is found by the search at block 404, then block 410 returns an indication that the user switch is permitted. Otherwise, block 408 returns an indication that the switch is not permitted.

Figure 5:
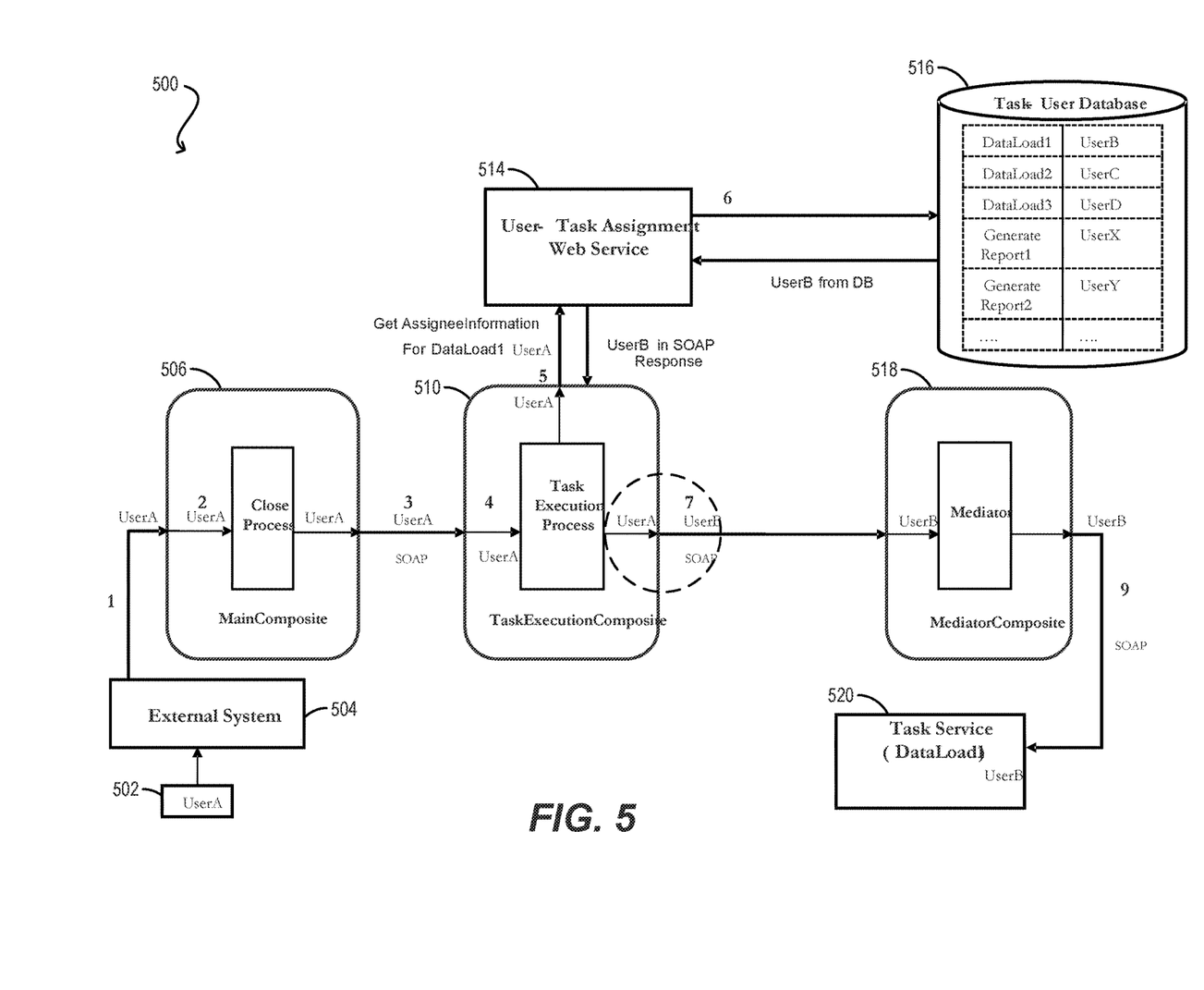
FIG. 5 is an illustrative drawing of an example scenario of processes in which a user switch is performed in accordance with an embodiment of the invention.

FIG. 5 is an illustrative drawing of an example scenario of processes 500 in which a user switch is performed in accordance with an embodiment of the invention. In the scenario 500, a process named "Close" is invoked by an external system 504, which selects one of several possible tasks listed in a task-user database 516, and invokes the processes shown in FIG. 5 to invoke the selected task. Each of the possible tasks is to be invoked using a different user identity. For example, a task named DataLoad1 506 is to be invoked by user identity B, a task named DataLoad2 is to be invoked by user identity C, and so on. Thus the processes 500 contain a set of tasks that are executed by component applications 506, 510, 514, 518. A user A 500 starts the process via the external system 504, which invokes the main composite application 506 using the identity of user A (1). The main composite 506 includes the Close process, which invokes a task execution process of the task execution composite (3). The task execution process invokes a user task assignment web service 514, which retrieves the user identity that corresponds to a given task service. The retrieved user identity is returned back to the test execution process (6) via a SOAP response. The task execution composite 510 then prepares to send a request to a mediator composite 518 using the user identity returned by the user-task assignment service 514. The task execution composite performs a user switch to user B as described above with reference to FIGS. 1-4. The identity of user B is stored in a SOAP request message along with a token that verifies the authenticity of user B. The mediator composite 518 receives the request and executes a mediator process using the identity of user B. The mediator process then invokes a task service 520 e.g., the DataLoad1 process, using the identity of user B (9).

It should be appreciated that the description above is illustrative and not intended to limit embodiments of the present invention. For example, dynamic identity switching can apply to a number of different types of authentication mechanisms other than SAML. One of ordinary skill in the art will recognize many variations, modifications, and alternatives.

Figure 6:
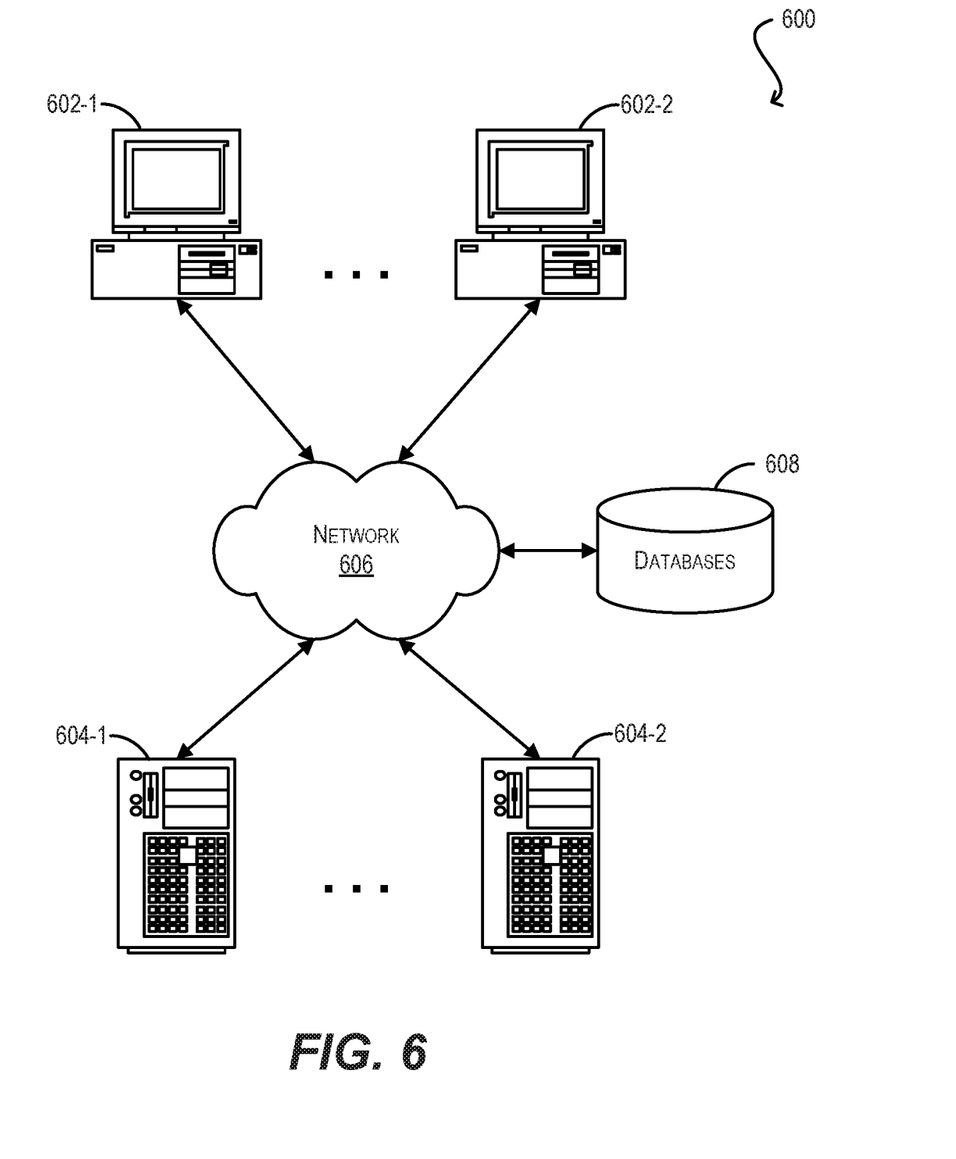
FIG. 6 is a simplified block diagram of a system environment in accordance with an embodiment of the present invention.

FIG. 6 is a simplified block diagram illustrating a system environment 600 that can be used in accordance with an embodiment of the present invention. As shown, system environment 600 can include one or more client computing devices 602-1, 602-2, which can be configured to operate a client application such as a web browser, a UNIX/Solaris terminal application, and/or the like. In various embodiments, client computing devices 602-1, 602-2 can be used by, e.g., user 112 of FIG. 1 to access web application 102.

Client computing devices 602-1, 602-2 can be general purpose personal computers (e.g., personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 602-1, 602-2 can be any other electronic device capable of communicating over a network, such as network 606 described below. Although system environment 600 is shown with two client computing devices, it should be appreciated that any number of client computing devices can be supported.

System environment 600 can further include a network 606. Network 606 can be any type of network familiar to those skilled in the art that can support data communications using a network protocol, such as TCP/IP, SNA, IPX, AppleTalk, and the like. Merely by way of example, network 606 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 600 can further include one or more server computers 604-1, 604-2 which can be general purpose computers, specialized server computers (including, e.g., PC servers, UNIX servers, mid-range servers, mainframe computers, rack-mounted servers, etc.), server farms, server clusters, or any other appropriate arrangement and/or combination. Servers 604-1, 604-2 can run an operating system including any of those discussed above, as well as any commercially available server operating system. Servers 604-1, 604-2 can also run any of a variety of server applications and/or mid-tier applications, including web servers, FTP servers, CGI servers, Java virtual machines, and the like. In one set of embodiments, servers 604-1, 604-2 can each run an application server that is configured to provide an execution environment for web application 102, web service 104, web service client 102, and/or web service 104 of FIGS. 1 and 1.

System environment 600 can further include one or more databases 608. In one set of embodiments, databases 608 can include databases that are managed by one or more of servers 604-1, 604-2. Databases 608 can reside in a variety of locations. By way of example, databases 608 can reside on a storage medium local to (and/or resident in) one or more of computers 602-1, 602-2, 604-1, 604-2. Alternatively, databases 608 can be remote from any or all of computers 602-1, 602-2, 604-1, 604-2, and/or in communication (e.g., via network 606) with one or more of these. In one set of embodiments, databases 608 can reside in a storage-area network (SAN) familiar to those skilled in the art.

Figure 7:
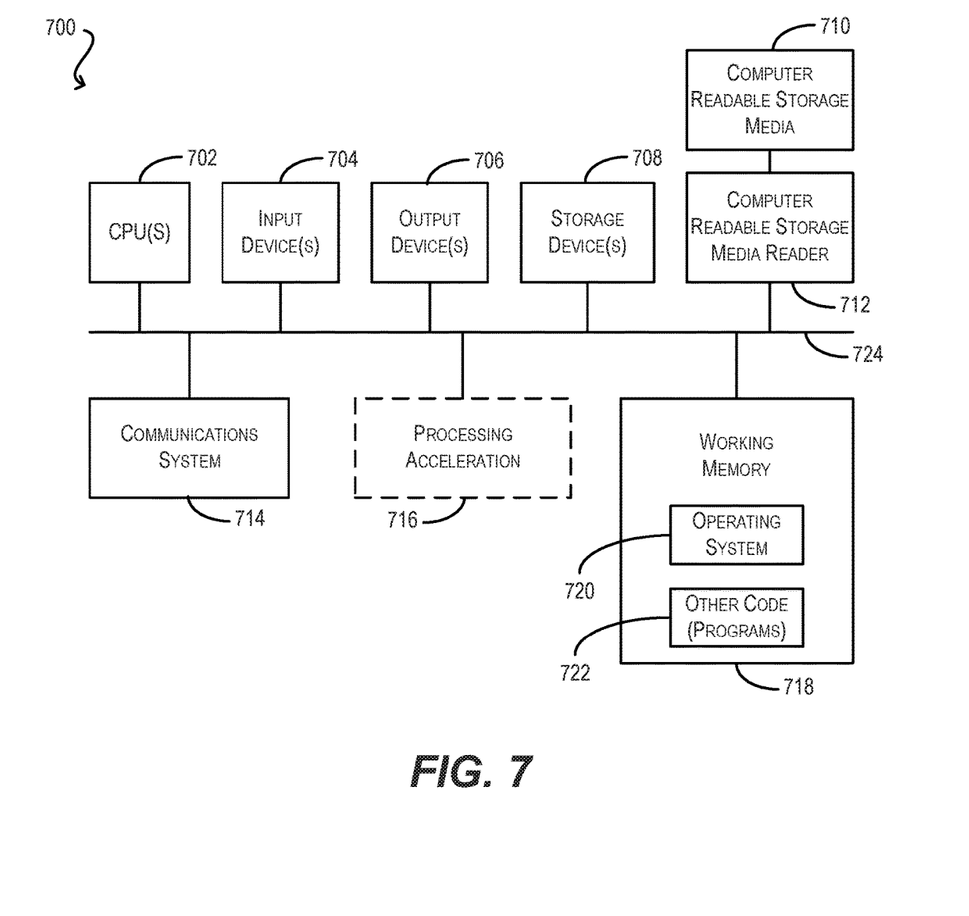
FIG. 7 is a simplified block diagram of a computer system in accordance with an embodiment of the present invention.

FIG. 7 is a simplified block diagram illustrating a computer system 700 that can be used in accordance with an embodiment of the present invention. In various embodiments, computer system 700 can be used to implement any of computers 602-1, 602-2, 604-1, 604-2 described with respect to system environment 600 above. As shown, computer system 700 can include hardware elements that are electrically coupled via a bus 724. The hardware elements can include one or more central processing units (CPUs) 702, one or more input devices 704 (e.g., a mouse, a keyboard, etc.), and one or more output devices 706 (e.g., a display device, a printer, etc.). Computer system 700 can also include one or more storage devices 708. By way of example, the storage device(s) 708 can include devices such as disk drives, optical storage devices, and solid-state storage devices such as a random access memory (RAM) and/or a read-only memory (ROM), which can be programmable, flash-updateable and/or the like.

Computer system 700 can additionally include a computer-readable storage media reader 712, a communications subsystem 714 (e.g., a modem, a network card (wireless or wired), an infra-red communication device, etc.), and working memory 718, which can include RAM and ROM devices as described above. In some embodiments, computer system 700 can also include a processing acceleration unit 716, which can include a digital signal processor (DSP), a special-purpose processor, and/or the like.

Computer-readable storage media reader 712 can be connected to a computer-readable storage medium 710, together (and, optionally, in combination with storage device(s) 708) comprehensively representing remote, local, fixed, and/or removable storage devices plus storage media for temporarily and/or more permanently containing computer-readable information. Communications system 714 can permit data to be exchanged with network 606 and/or any other computer described above with respect to system environment 600.

Computer system 700 can also comprise software elements, shown as being currently located within working memory 718, including an operating system 720 and/or other code 722, such as an application program (which may be a client application, Web browser, middle tier/server application, etc.). It should be appreciated that alternative embodiments of computer system 700 can have numerous variations from that described above. For example, customized hardware can be used and particular elements can be implemented in hardware, software, or both. Further, connection to other computing devices such as network input/output devices can be employed.

Computer readable storage media for containing code, or portions of code, executable by computer system 700 can include any appropriate media known or used in the art, such as but not limited to volatile/non-volatile and removable/non-removable media. Examples of computer-readable storage media include RAM, ROM, EEPROM, flash memory, CD-ROM, digital versatile disk (DVD) or other optical storage, magnetic cassettes, magnetic tape, magnetic disk storage or other magnetic storage devices, an any other medium that can be used to store data and/or program code and that can be accessed by a computer.

Although specific embodiments of the invention have been described above, various modifications, alterations, alternative constructions, and equivalents are within the scope of the invention. For example, although embodiments of the present invention have been described with respect to certain process flows and steps, it should be apparent to those skilled in the art that the scope of the present invention is not limited to the described flows/steps.

Yet further, although embodiments of the present invention have been described using a particular combination of hardware and software, it should be recognized that other combinations of hardware and software are also within the scope of the present invention.

The specification and drawings are, accordingly, to be regarded in an illustrative rather than restrictive sense. It will be evident that additions, subtractions, and other modifications may be made thereunto without departing from the broader spirit and scope of the invention.

What is claimed is:

1. A method comprising:
receiving, by a computer system, an invocation by a web application acting as a web service client of a web service, wherein the invocation by the web application comprises a first username property representing a first identity using the web application and a second username property representing a second identity declared to be propagateable in web service invocations;
while executing a first task using the first identity, receiving a request to dynamically switch from the first identity to the second identity, wherein the first identity is of a first user and the second identity is of a second user that is different from the first user;
determining, by the computer system, a set of one or more switching rules using the first identity and the second identity in the invocation of the web service;
verifying, by the computer system, during runtime that the switch from the first identity to the second identity that is included in the invocation is permitted by applying the set of one or more switching rules and determining that the web application is a permitted application in accordance with a permission object;
including, by the computer system, the second identity in the second username property in a service request to the web service when the switch is permitted, wherein including the second identity in the service request comprises storing the second identity in a Security Assertion Markup Language (SAML) security token included in the service request;
communicating, by the computer system, the service request to the web service; and
executing, by the web service, a second task using the second identity in accordance with the one or more switching rules, wherein after executing the second task using the second identity, switching from the second identity to the first identity.

2. The method of claim 1, wherein the permission object identifies a trusted application that can be accessed by the second identity.

3. The method of claim 1, wherein the one or more switching rules comprise associations between initial user identities and permitted user identities, and
verifying that a switch is permitted comprises searching, by the computer system, the associations for an entry having an initial user identity that matches the first identity and a new user identity that matches the second identity,
wherein the switch is permitted when the entry is found in the associations.

4. The method of claim 1, wherein invocation by the second identity is permitted when one or more attributes of at least one of the one or more switching rules match corresponding values determined at runtime.

5. The method of claim 1, wherein a first rule of the one or more switching rules comprises the permitted application, a permitted initial identity, and a permitted new identity, and the verifying that a switch is permitted comprises:
comparing the permitted application to a client application that invoked the web service,
comparing the permitted initial identity to the first identity, and
comparing the permitted new identity to the second identity,
wherein the invocation by the second identity is permitted when the permitted application matches the client application, the permitted initial identity matches the first identity, and the permitted new identity matches the second identity.

6. The method of claim 5, wherein the first rule of the one or more switching rules comprises a condition based on one or more attributes of the client application, and invocation by the second identity is permitted when the condition is satisfied.

7. The method of claim 6, wherein the condition is further based upon one or more values determined at runtime.

8. The method according to claim 1, wherein the set of one or more switching rules comprises a permitted identity identified in accordance with a permission map.

9. The method according to claim 1, wherein the permission object specifies one or more permitted applications corresponding to one or more permitted identities.

10. The method according to claim 1, wherein the second user has authorization privileges that are different from authorization privileges of the first user.

11. A non-transitory machine-readable medium storing a series of instructions executable by a processor of a computer system, the non-transitory computer-readable medium comprising:
instructions that cause the processor to receive an invocation by a web application acting as a web service client of a web service, wherein the invocation by the web application comprises a first username property representing a first identity of using the web application and a second username property representing a second identity declared to be propagateable in web service invocations;
instructions that cause the processor to while executing a first task using the first identity, receive a request to dynamically switch from the first identity to the second identity, wherein the first identity is of a first user and the second identity is of a second user that is different from the first user;
instructions that cause the processor to determine a set of one or more switching rules using the first identity and the second identity in the invocation of the web service;
instructions that cause the processor to verify during runtime that the switch from the first identity to the second identity that is included in the invocation is permitted by applying the set of one or more switching rules and determining that the web application is a permitted application in accordance with a permission object;
instructions that cause the processor to include the second identity in the second username property in a service request to the web service when the switch is permitted, wherein including the second identity in the service request comprises storing the second identity in a Security Assertion Markup Language (SAML) security token included in the service request;
instructions that cause the processor to communicate the service request to the web service; and
instructions that cause the web service to execute a second task using the second identity in accordance with the one or more switching rules, wherein after executing the second task using the second identity, switching from the second identity to the first identity.

12. The machine-readable medium of claim 11, wherein the one or more switching rules comprise associations between initial identities and permitted identities, and
the instructions that cause the processor to verify that a switch is permitted comprise instructions that cause the processor to search the associations for an entry having an initial identity that matches the first identity and a new identity that matches the second identity,
wherein the switch is permitted when the entry is found in the associations.

13. The machine-readable medium of claim 11, wherein invocation by the second identity is permitted when one or more attributes of the rule match corresponding values determined at runtime.

14. The machine-readable medium of claim 11, wherein a first rule of the one or more switching rules comprises the permitted application, a permitted initial identity, and a permitted new identity, and the instructions that cause the processor to verify that a switch is permitted comprise:
instructions that cause the processor to compare the permitted application to a client application,
instructions that cause the processor to compare the permitted initial identity to the first identity, and
instructions that cause the processor to compare the permitted new identity to the second identity,
wherein the invocation by the second identity is permitted when the permitted application matches the client application, the permitted initial identity matches the identity of the first identity, and the permitted new identity matches the second identity.

15. A system for dynamically switching between identities of different entities to request web services, the system comprising:
a hardware processor; and
a non-transitory memory configured to store a set of instructions which when executed by the processor causes the processor to:
receive an invocation by a web application acting as a web service client of a web service, wherein the invocation by the web application comprises a first username property representing a first identity using the web application and a second username property representing a second identity declared to be propagateable in web service invocations;

while executing a first task using the first identity, receive a request to dynamically switch from the first identity to the second identity, wherein the first identity is of a first user and the second identity is of a second user that is different from the first user;

determine a set of one or more switching rules using the first identity and the second identity in the invocation of the web service;

verify during runtime that the switch from the first identity to the second identity that is included in the invocation is permitted by applying the set of one or more switching rules and determining that the web application is a permitted application in accordance with a permission object;

include the second identity in the second username property in a service request to the web service when the switch is permitted, wherein including the second identity in the service request comprises storing the second identity in a Security Assertion Markup Language (SAML) security token included in the service request;

communicate the service request to the web service; and execute, by the web service, a second task using the second identity in accordance with the one or more switching rules, wherein after executing the second task using the second identity, switching from the second identity to the first identity.

* * * * *

UNITED STATES PATENT AND TRADEMARK OFFICE
CERTIFICATE OF CORRECTION

| | | |
|---|---|---|
| PATENT NO. | : 10,135,803 B2 | Page 1 of 1 |
| APPLICATION NO. | : 15/299196 | |
| DATED | : November 20, 2018 | |
| INVENTOR(S) | : Kavantzas et al. | |

It is certified that error appears in the above-identified patent and that said Letters Patent is hereby corrected as shown below:

In the Specification

In Column 5, Line 13, delete "the a" and insert -- a --, therefor.

Signed and Sealed this
Nineteenth Day of November, 2019

Andrei Iancu
*Director of the United States Patent and Trademark Office*